(12) United States Patent
Fayyad et al.

(10) Patent No.: US 6,581,058 B1
(45) Date of Patent: Jun. 17, 2003

(54) SCALABLE SYSTEM FOR CLUSTERING OF LARGE DATABASES HAVING MIXED DATA ATTRIBUTES

(75) Inventors: Usama Fayyad, Mercer Island, WA (US); Paul S. Bradley, Seattle, WA (US); Cory A. Reina, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/700,606

(22) PCT Filed: Mar. 29, 1999

(86) PCT No.: PCT/US99/06717

§ 371 (c)(1),
(2), (4) Date: Jan. 31, 2001

(87) PCT Pub. No.: WO99/62007

PCT Pub. Date: Dec. 2, 1999

Related U.S. Application Data

(63) Continuation-in-part of application No. 09/083,906, filed on May 22, 1998, now Pat. No. 6,263,337.
(60) Provisional application No. 60/086,410, filed on May 22, 1998.

(51) Int. Cl.[7] ............................. G06F 17/30; G06F 7/00

(52) U.S. Cl. ........................................... 707/6; 707/101

(58) Field of Search ............................... 707/6, 7, 101, 707/102

(56) References Cited

U.S. PATENT DOCUMENTS

| | | | |
|---|---|---|---|
| 5,329,596 A | | 7/1994 | Sakou et al. |
| 5,832,182 A | | 11/1998 | Zhang et al. |
| 5,832,482 A | | 11/1998 | Yu et al. |
| 5,875,285 A | | 2/1999 | Chang |
| 5,884,305 A | | 3/1999 | Kleinberg et al. |
| 5,970,482 A | * | 10/1999 | Pham et al. .................. 706/16 |
| 6,260,038 B1 | * | 7/2001 | Martin et al. .................. 707/7 |
| 6,301,579 B1 | * | 10/2001 | Becker ........................ 707/102 |
| 6,374,251 B1 | * | 4/2002 | Fayyad et al. .............. 707/101 |
| 6,449,612 B1 | * | 9/2002 | Bradley et al. ................ 707/6 |

* cited by examiner

Primary Examiner—Safet Metjahic
Assistant Examiner—Cindy Nguyen
(74) Attorney, Agent, or Firm—Watts, Hoffman, Fisher & Heinke, Co., L.P.A.

(57) ABSTRACT

One exemplary embodiment of a scalable clustering algorithm accesses a database of records having attributes or data fields of both enumerated discrete and ordered values and brings a portion of the data records into a rapid access memory. A cluster model for the data includes a table of probabilities for the enumerated, discrete data fields of the data records. The cluster model for data fields that are ordered comprises a mean and spread of the cluster. The cluster model is updated from the database records brought into the rapid access memory. At least some of the database records in the rapid access memory are summarized and stored within the rapid access memory. A criteria is then evaluated to determine if further data should be accessed from the database to further cluster data records in the database. Based on the evaluating step, additional database records in the database are accessed and brought into the rapid access memory for further updating of the cluster model.

34 Claims, 8 Drawing Sheets

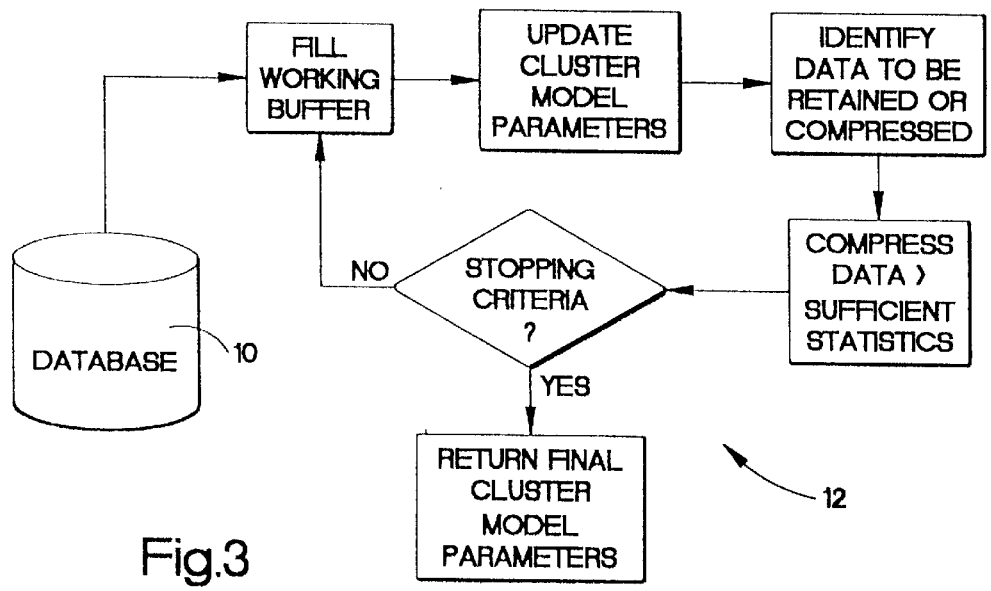
Fig.3
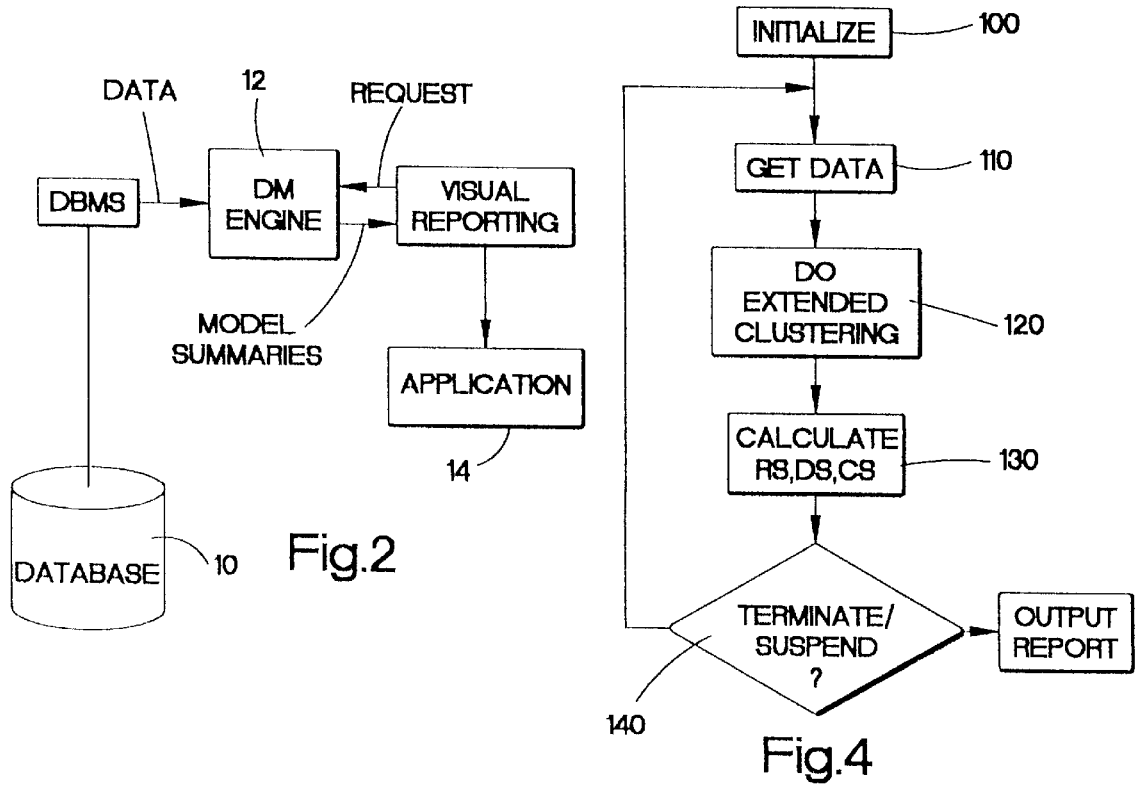
Fig.2
Fig.4

MODEL PROBABILITY CLUSTER #K

| ATTRIBUTE ID | DISCRETE VALUE #1 | DISCRETE VALUE #1 | DISCRETE VALUE #1 | | DISCRETE VALUE #i |
|---|---|---|---|---|---|
| 1 | PROB 1/1 | PROB 1/2 | PROB 1/3 | | |
| 2 | | | | | |
| 3 | | | | | |
| ⋮ | | | | | |
| ATTRIBUTE j | PROB j/1 | PROB j/2 | | | PROB j/i |

SAMPLE PROBABILITY TABLE CLUSTER #1

| ATTRIBUTE | | | | |
|---|---|---|---|---|
| COLOR | RED 0.0875 | BLUE 0.3001 | GREEN 0.4374 | WHITE 0.1750 |
| STYLE | SEDAN 0.5627 | SPORT 0.3500 | TRUCK 0.0873 | |
| SEX | MALE 0.2624 | FEMALE 0.7376 | | |

Fig.9B

SCALABLE SYSTEM FOR CLUSTERING OF LARGE DATABASES HAVING MIXED DATA ATTRIBUTES

CROSS REFERENCE TO RELATED APPLICATIONS

The present invention is a continuation in part of Ser. No. 09/083,906, U.S. Pat. No. 6,263,337 entitled "A Scalable System for Expecttion Maximization Clustering of Large Databases" to Fayyad et al filed May 22, 1998 issued Jul. 17, 2001, and which is assigned to the assignee of the present application and is incorporated herein by reference.

Priority is claimed from provisional U.S. patent application Ser. No. 60/086,410 filed May 22, 1998.

FIELD OF THE INVENTION

The present invention concerns database analysis and more particularly concerns an apparatus and method for clustering of data into groups that capture important regularities and characteristics of the data.

BACKGROUND ART

Large data sets are now commonly used in most business organizations. In fact, so much data has been gathered that asking even a simple question about the data has become a challenge. The modern information revolution is creating huge data stores which, instead of offering increased productivity and new opportunities, can overwhelm the users with a flood of information. Tapping into large databases for even simple browsing can result in a return of irrelevant and unimportant facts. Even people who do not 'own' large databases face the overload problem when accessing databases on the Internet. A large challenge now facing the database community is how to sift through these databases to find useful information.

Existing database management systems (DBMS) perform the steps of reliably storing data and retrieving the data using a data access language, typically SQL. One major use of database technology is to help individuals and organizations make decisions and generate reports based on the data contained in the database.

An important class of problems in the areas of decision support and reporting are clustering (segmentation) problems where one is interested in finding groupings (clusters) in the data. Data clustering has been used in statistics, pattern recognition, machine learning, and many other fields of science and engineering. However, implementations and applications have historically been limited to small data sets with a small number of dimensions or fields.

Each data cluster includes records that are more similar to members of the same cluster than they are similar to rest of the data. For example, in a marketing application, a company may want to decide who to target for an ad campaign based on historical data about a set of customers and how they responded to previous campaigns. Employing analysts (statisticians) to build cluster models is expensive, and often not effective for large problems (large data sets with large numbers of fields). Even trained scientists can fail in the quest for reliable clusters when the problem is high-dimenisional (i.e. the data has many fields, say more than 20).

Clustering is a necessary step in the mining of large databases as it represents a mean is for finding segments of the data that need to be modeled separately. This is an especially important consideration for large databases where a global model of the entire data typically makes no sense as data represents multiple populations that need to be modeled separately. Random sampling cannot help in deciding what the clusters are. Finally, clustering is an essential step if one needs to perform density estimation over the database (i.e. model the probability distribution governing the data source).

Applications of clustering are numerous and include the following broad areas: data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in Electronic Commerce.

Clustering has been formulated in various ways. The fundamental clustering problem is that of grouping together (clustering) data items that are similar to each other. The most general approach to clustering is to view it as a density estimation problem. We assume that in addition to the observed variables for each data item, there is a hidden, unobserved variable indicating the "cluster membership" of the given data item. Hence the data is assumed to arrive from a mixture model and the mixing labels (cluster identifiers) are hidden. In general, a mixture model M having K clusters Ci, i=1, . . . , K, assigns a probability to a particular data record or point x as follows:

$$Pr(x|M) = \sum_{i=1}^{K} W_i \cdot Pr(x|Ci, M)$$

where $W_i$ are called the mixture weights.

The problem then is estimating the parameters of the individual Ci. Usually it is assumed that the number of clusters K is known and the problem is to find the best parameterization of each cluster model. A popular technique for estimating the model parameters (including cluster parameters and mixture weights) is the EM algorithm (see P. Cheeseman and J. Stutz, "Bayesian Classification (AutoClass): Theory and Results", in Advances in Knowledge Discovery and Data Mining, Fayyad, U., G. Piatetsky-Shapiro, P. Smyth, and R. Uthurusamy (Eds.), pp. 153–180. MIT Press, 1996; and A. P. Dempster, N. M. Laird, and D. B. Rubin, "Maximum Likelihood from Incomplete Data via the EM algorithm". Journal of the Royal statistical Society, Series B, 39(1): 1–38, 1977).

There are various approaches to solving the optimization problem of determining (locally) optimal values of the parameters given the data. The iterative refinement approaches are the most effective. The basic algorithm goes as follows:

1. Initialize the model parameters, producing a current model.
2. Decide memberships of the data items to clusters, assuming that the current model is correct.
3. Re-estimate the parameters of the current model assuming that the data memberships obtained in 2 are correct, producing a new model.
4. If the current model and the new model are sufficiently close to each other, terminate, else go to 2. In this step 'close' is evaluated by a predefined one of multiple possible stopping criteria.

The most popular clustering algorithms in the pattern recognition and statistics literature belong to the above iterative refinement family: the K-Means algorithm. See E. Forgy, "Cluster analysis of multivariate data: Efficiency vs. interpretability of classifications", Biometrics 21:768. 1965 or J. MacQueen, "Some methods for classification and analysis of multivariate observations. In *Proceedings of the Fifth Berkeley Symposium on Mathematical Statistics and Probability.* Volume I, Statistics, L. M. Le Cam and J. Neyman (Eds.). University of California Press, 1967.

There are other variants of clustering procedures that iteratively refine a model by rescanning the data many times. The difference between the EM and K-Means is the membership decision (step 2). In K-Means, a data item belongs to a single cluster, while in EM each data item is assumed to belong to every cluster but with a different probability. This of course affects the update step (3) of the algorithm. In K-Means each cluster is updated based strictly on its membership. In EM each cluster is updated by contributions from the entire data set according to the relative probability of membership of each data record in the various clusters.

SUMMARY OF THE INVENTION

The present invention concerns automated analysis of large databases to extract useful information such as models or predictors from data stored in the database. One of the primary operations in data mining is clustering (also known as database segmentation). One of the most well-known algorithms for probabilistic clustering of a database with both discrete and continuous attributes is the Expectation-Maximization (EM) algorithm applied to a Multinomial/Gaussian mixture.

Discrete data refers to instances wherein the values of a particular field in the database are finite and not ordered. For instance, color is a discrete feature having possible values (green, blue, red, white, black) and it makes no sense to impose an ordering on these values (i.e. green>blue?).

When applied to a Multinomial/Gaussian mixture the E-M process models the discrete fields of the database with Multinomial distributions and the continuous fields of the database with a Gaussian distribution. The Multinomial distribution is associated with each attribute and is characterized by a set of probabilities, one probability for each possible value of the corresponding attribute in the database. The Gaussian distribution for continuous data is characterized by a mean and a covariance matrix. The EM process estimates the parameters of these distributions over the database as well as the mixture weights defining the probability model for the database $$Pr(x|M) = \sum_{i=1}^{K} W_i \cdot Pr(x|Ci, M).$$

These statistics (set of probabilities for each discrete attribute/value pair and mean and covariance matrix for continuous attributes) provide essential summary statistics of the database and allow for a probabilistic interpretation regarding the membership of a given record in a particular cluster. Given a desired number of clusters K, each cluster is represented by a Gaussian distribution over the continuous database variables and a Multinomial distribution for each discrete attribute (characterized by a probability of observing each value of this discrete attribute). The parameters associated with each of these distributions are estimated by the EM algorithm.

One exemplary embodiment of a scalable clustering algorithm accesses a database of records having attributes or data fields of both enumerated discrete and ordered (continuous) values and brings a portion of the data records into a rapid access memory. Each cluster of database records is represented by a table of probabilities summarizing the enumerated, discrete data fields of the data records in this cluster, and a mean and covariance matrix summarizing the continuous attributes of the records in the cluster. Each entry in the probability table for the discrete attributes represents the probability of observing a specific value of a given discrete attribute in the considered cluster. The mean vector and covariance matrix summarize the distribution of the values of the continuous attributes in the considered cluster. The clusters are updated from the database records brought into the rapid access memory. Sufficient statistics for at least some of the database records in the rapid access memory are summarized. The sufficient statistics (summaries) are made up of a data structure similar to the clusters, i.e. it includes a Gaussian distribution over the continuous record attributes and Multinomial distributions for the discrete attributes. The sufficient statistics are stored within the rapid access memory and the database records that are used to derive these sufficient statistics are removed from rapid access memory. A criteria is then evaluated to determine if further data should be accessed from the database to further cluster data records in the database. Based on this evaluation, additional database records in the database are accessed and brought into the rapid access memory for further updating of the cluster model.

The invention can be used in data mining to: visualize, summarize, navigate, and predict properties of the data/clusters in a database. The parameters allow one to assign data points (database records) to a cluster in a probabilistic fashion (i.e. a point or database record belongs to all K clusters with a computable, and interpretable probability). Probabilistic clustering also plays an important role in operations such as sampling, indexing, and increasing the efficiency of data access in a database. The invention consists of a new methodology and implementation for scaling the EM algorithm to work with large databases consisting of both discrete and continuous attributes, including ones that cannot be loaded into the main memory of the computer. Without this method, clustering would require significantly more memory, or many unacceptably expensive scans of the data in the database.

This invention enables effective and accurate clustering in one or less database scans. Furthermore, known previous computational work on clustering with the EM algorithm addressed datasets that are either discrete or continuous. Often, if the database contained both discrete and continuous fields, the continuous fields are discretized prior to applying the clustering technique. The present invention avoids removing this natural order from certain fields of the database and explicitly address the issue of probabilistically clustering a database with both discrete and continuous attributes.

BRIEF DESCRIPTION OF THE DRAWINGS

FIGS. 2 and 3 are schematic depictions of software components for performing data clustering in accordance with an exemplary embodiment of the present invention;

FIG. 4 is a flowchart of the processing steps performed by the computer system in clustering data;

FIGS. 9A and 9B are probability tables depicting sufficient statistics for discrete attributes of a data base having both discrete and continuous attribute records.

DETAILED DESCRIPTION OF EXEMPLARY EMBODIMENT OF THE INVENTION

Figure 1:
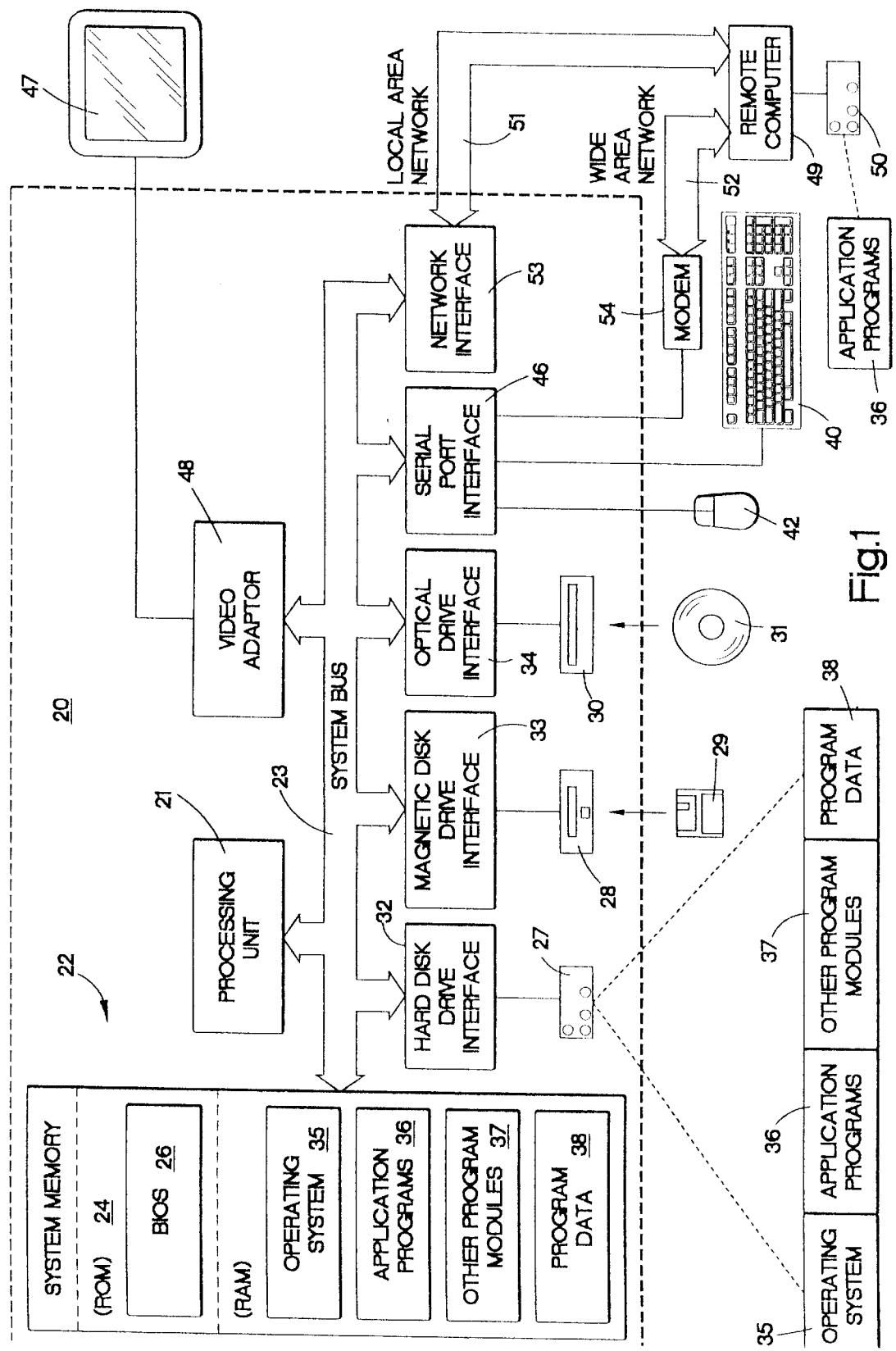
FIG. 1 is a schematic depiction of a computer system used in practicing an exemplary embodiment of the present invention.

The exemplary embodiment of the invention is implemented by software executing on a general purpose computer 20 a schematic of which is shown in FIG. 1. FIGS. 2 and 3 depict software components that define a data mining engine 12 constructed in accordance with the present invention. The data mining engine 12 clusters data records stored on a database 10. The data records have multiple attributes or fields that contain both discrete and continuous data. Depending on the number of data records and the size of those records, the database 12 is stored on a single fixed disk storage device or alternately can be stored on multiple distributed storage devices accessible to the computer's processing unit 21 over a network. In accordance with the present invention, the data mining engine 12 brings data from the database 10 into a memory 22 (FIG. 1) and outputs a clustering model (FIG. 8D).

The invention has particular utility in clustering data from a database 12 that contains many more records than can be stored in the computer's main memory 22. Data clustering is particularly important in data mining of large databases as it represents a means for finding segments or subpopulations of the data that are similar. For a large database, a global model of the entire database makes little sense since the data represents multiple populations that need to be modeled separately. The present invention concerns method and apparatus for determining a model for each cluster that includes a set of attribute/value probabilities for the enumerated discrete data fields and a mean and covariance matrix for the ordered data fields.

In a client/server implementation an application program 14 acts as the client and the data mining engine 12 acts as the server. The application program 14 receives an output model (FIG. 8D) and makes use of that model in one of many possible ways mentioned above such as marketing studies and fraud detection etc.

Discrete Data Fields

Consider five database records (Table 1) having three enumerated data fields. These records could be used, for example, by people making marketing evaluations of past trends for use in predicting future behavior. The data records describe purchases of motor vehicles. Only five records are depicted for purposes of explanation but a typical database will have many thousands if not millions of such records. To perform the clustering of the present invention the data records are read from the database 12 into a memory of a computer and the number of records stored in a memory at a given time is therefore dependent on the amount of computer memory allocated for the clustering process.

TABLE 1

| Record ID | Color | Style | Sex |
| --- | --- | --- | --- |
| 1 | yellow | sedan | male |
| 2 | blue | sedan | female |
| 3 | green | sedan | male |
| 4 | white | truck | male |
| 5 | yellow | sport | female |

Assume an initial cluster number K=3 is used to cluster the data. The number 3 can be arbitrarily assigned or can be chosen based upon an initial evaluation of the data. In addition, the initial values of the attribute/value probability tables for the discrete attributes in each cluster are initialized by some other process (possibly random initialization). Each record from Table 1 is assigned to each of the three clusters with a different probability or membership. This probability of membership of a data record in one of the clusters is computed based upon the attribute values of the record and the cluster attribute/value probability tables (discrete attributes). Consider the following partially determined cluster probabilities for a clustering evaluation of records like those depicted in Table 1. Suppose Cluster 1 represents 3.0 of 10.0 total data records, Cluster 2 represents 4.5 of the 10.0 data records and Cluster 3 represents the remaining 2.5 of the 10.0 data records

| Cluster Attribute/Value Probability Tables | | | | |
| --- | --- | --- | --- | --- |
| Cluster 1: Number of records: 3.0 | | | | |
| color | R<br>.1 | B<br>.2 | G<br>.5 | W<br>.2 |
| style | sedan<br>.5 | | sport<br>.4 | truck<br>.1 |
| sex | male<br>.3 | | female<br>.7 | |
| Cluster 2: Number of records: 4.5 | | | | |
| color | R<br>.3 | B<br>.1 | G<br>.1 | W<br>.5 |
| style | sedan<br>.1 | | sport<br>.6 | truck<br>.3 |
| sex | male<br>.65 | | female<br>.35 | |
| Cluster 3: Number of records: 2.5 | | | | |
| color | R<br>.3 | B<br>.25 | G<br>.25 | W<br>.2 |
| style | Sedan<br>.35 | | sport<br>.3 | truck<br>.35 |
| sex | Male<br>.45 | | female<br>.55 | |

As the data mining engine 10 gathers data from the database 12 and analyses that data, these cluster models change based on the values of the data gathered from the database. Note, that the attribute/value probability tables have a row for each discrete attribute and a column for each value of the corresponding attribute and that the sum of the probabilities for the values of a given attribute of a given cluster sum to 1.0.

Consider RecordID #2 from table 1. The values of the three attributes for this record are 'blue', 'sedan', and 'female' corresponding to an instance of a female purchasing a blue sedan. Based on the above probabilities this record belongs to cluster 1 with a probability proportional to (0.2)(0.5)(0.7)=0.070. This value is determining by finding the attribute 'blue' and noting that for cluster number 1 the probability of this attribute is 0.2. Similarly, the probabilities for 'sedan' and 'female' in cluster number 1 are 0.5 and 0.7 respectively. The product of these three probabilities is 0.070.

Now examine the values of this record for clusters 2 and 3.
Cluster 2: (0.1)(0.1)(0.35)=0.0035.
Cluster 3: (0.25)(0.35)(0.55)=0.048125

To take into account the number of data records represented by each cluster, we multiply each cluster value by the fraction of total records belonging to the cluster to obtain the following values:

Cluster 1: (3.0/10.0)*(0.070)=0.021

Cluster 2: (4.5/10.0)*(0.035)=0.01575

Cluster 3: (2.5/10.0)*(0.048125)=0.01203

These values are normalized (adjusted so they sum to 1.0 by dividing each of the 3 values by the sum) giving the probabilities of membership of RecordID#2 in each of the 3 clusters:

Probability of membership of RecordID#2 in Cluster 1: 0.4305

Probability of membership of RecordID#2 in Cluster 2: 0.3228

Probability of membership ofRecordID#2 in Cluster 3: 0.2467

For this discussion the values are placed into the augmented record chart of Table 2.

TABLE 2

| ID | Color | Style | Sex | Cluster Probability | | |
|---|---|---|---|---|---|---|
| | | | | #1 | #2 | #3 |
| 1 | yellow | sedan | male | | | |
| 2 | blue | sedan | female | 0.4305 | 0.3228 | 0.2467 |
| 3 | green | sedan | male | | | |
| 4 | white | truck | male | | | |
| 5 | yellow | sport | female | | | |

After a given subset of data records have been read from the database, the cluster attribute/value probabilities for the three clusters are updated based upon the cluster membership probabilities for each of the recently gathered data records as well as records evaluated during previous steps of gathering data from the database 12.

The process of updating these probabilities takes into account the number of data records that have been previously gathered from the database as well as the number of new records that were most recently extracted from the database 12. As a simplified example, assume a total of ten records having been classified and have been used to determine the Cluster Models shown above.

Suppose Cluster No. 1 represents 3.0 of the 10 data points already processed and we wish to update the attribute/value probabilities for the discrete attribute Color in cluster No. 1 based on the addition of RecordID #2, one has:

| | Number of Points represented | color | | | |
|---|---|---|---|---|---|
| | | R | B | G | W |
| (ten records) | 3.0 | .1 | .2 | .5 | .2 |
| (one record, ID #2) | 0.4305 | 0.0 | 1.0 | 0.0 | 0.0 |
| (eleven records) | 3.4305 | 0.0875 | 0.3001 | 0.4374 | 0.1750 |

The entry of 3.0 under "Number of Points represented" for the ten records indicates that 3.0 of the 10 records processed thus far are represented by this cluster. Similarly, for cluster #1, we've already calculated that 0.4305 of RecordID#2 is assigned to this cluster, while 0.3228 of it is assigned to cluster 2 and 0.2467 of it is assigned to cluster 3. Hence, after RecordID#2 is processed, we've seen 11 records and 3.0+0.4305=3.4305 of these 11 points are represented by cluster #1.

The formula for computing the updated probability for the red value (R) of the color attribute is: ((3.0)*(0.1)+(0.4305) *(0.0))/(3.0+0.4305)=(0.3)/(3.4305)=0.0875

The formula for computing the update for blue (B) is:

$$((3.0)*(0.2)+(0.4305)*(1.0))/(3.0+0.4305)=(1.0305)/(3.4305)= 0.3001$$

The formula for computing the update for green (G) is:

$$((3.0)*(0.5)+(0.4305)*(0.0))/(3.0+0.4305)=(1.5)/(3.4305)=0.4374$$

The formula for computing the update for white (W) is:

$$((3.0)*(0.2)+(0.4305)*(0.0))/(3.0+0.4305)=(0.6)/(3.4305)=0.1750$$

The other attribute probabilities for cluster #1 are updated in a similar fashion:

| | Number of Points represented | style | | | sex | |
|---|---|---|---|---|---|---|
| | | sedan | sport | truck | male | female |
| (ten records) | 3.0 | .5 | .4 | .1 | .3 | .7 |
| (one record, ID #2) | 0.4305 | 1.0 | 0.0 | 0.0 | 0.0 | 1.0 |
| (eleven records) | 3.4305 | 0.5627 | 0.350 | 0.0873 | 0.2624 | 0.7376 |

An updated attribute/value probability table for this cluster showing all three discrete attributes and their updated values is shown in FIG. 9B.

When computing the probability memberships of a given data record in each cluster, we also contemplate not taking into account the fraction of the database represented by a given cluster. In this case probability of membership of RecordID#2 in each of the 3 clusters would be proportional to the following values which do not account for the fraction of data records in each cluster:

Cluster 1: (0.2)(0.5)(0.7)=0.070
Cluster 2: (0.1)(0.1)(0.35)=0.0035.
Cluster 3: (0.25)(0.35)(0.55)=0.048125

The resulting probabilities of membership for RecordID#2 based upon the above values are:

Cluster 1: (0.070)/(0.070+0.0035+0.048125)=0.5755
Cluster 2: (0.0035)/(0.070+0.00354+0.048125)=0.0288
Cluster 3: (0.048125)/(0.070+0.0035+0.048125)=0.3957

And these values could be used to update the attribute/value probability tables for each of the clusters in the same fashion.

Mixed Data Clustering Model

Now assume that instead of including only data records with discrete non-ordered data, the records read from the database 12 have discrete data like color and ordered (continuous) attributes such as a salary field and an age field. These additional fields are continuous and it makes sense to take the mean and covariance, etc. of the values for these additional fields. For each of the 3 clusters being modeled, one can assign a Gaussian (having a mean and covariance matrix) to the income and age attributes and calculate contributions to each cluster for each data record based upon its attribute values.

Now again consider the records from Table 1. In addition to the previously discussed three attributes of 'color', 'style' and 'sex', each record has the additional attributes of 'income' and 'age'. These mixed attribute records are listed below in Table 3. Note, the female that purchased the blue sedan (RecordId #2) is now further classified with the information that she has an income of 46K and an age of 47 years.

TABLE 3

| Record ID | Color  | Style | Sex    | Income | Age    |
|-----------|--------|-------|--------|--------|--------|
| 1         | yellow | sedan | male   | 24K    | 32 yrs |
| 2         | blue   | sedan | female | 46K    | 47     |
| 3         | green  | sedan | male   | 82K    | 66     |
| 4         | white  | truck | male   | 40K    | 30     |
| 5         | yellow | sport | female | 38K    | 39     |

For each of the records of Table 3 the data mining engine 12 must compute the probability of membership of each data record in each of the three clusters. Suppose, in the general case, the discrete attributes are labeled "DiscAtt#1", "DiscAtt#2", . . . , "DiscAtt#d" and let the remaining continuous attributes make up a numerical vector x. The notation for determining this probability is:

Prob(record|cluster #)=p(DiscAtt#1|cluster #)*p(DiscAtt#2|cluster #)* . . . *p(DiscAtt#d|cluster #*p(x|$\mu$,$\Sigma$ of cluster #). Here p(DiscAttr#j|cluster #) is computed by looking up the stored probability of DiscAttr#j in the given cluster (i.e. reading the current probability from the attribute/value probability table associated with this cluster). p(x|$\mu$,$\Sigma$ of cluster #) is calculated by computing the value of x under a normal distribution with mean A and covariance matrix $\Sigma$:

$$p(x|\mu, \Sigma \text{ of cluster \#}) = \frac{1}{(2\pi)^{n/2}\sqrt{|\Sigma|}} \exp\left\{-\frac{1}{2}(x-\mu)^T(\Sigma)^{-1}(x-\mu)\right\}$$

When performing an expectation maximization (EM) clustering analysis such as an analysis described in the Fayyad et al parent patent application Ser. No. 09/083,906, each data point is assigned to each of the K clusters (K=3 in the above example) with a probability or weighting factor. For example, if all the attributes of data records in the database are ordered, then each cluster has a mean and a covariance matrix of a dimension equal to the number of attributes in the data record. For a data record having n ordered dimensions, the resulting covariance matrix is an n×n matrix.

If the EM analysis is used in conjunction with an exemplary embodiment of the present invention, one associates a Gaussian distribution of data about the centroid of each of the K clusters for the ordered dimensions. For each of the data records (having mixed discrete and ordered attributes) a weighting factor is similarly determined indicating the degree of membership of this data record in a given cluster. In our example with 3 clusters, the weightings are determined by:

Weight in cluster 1=P(record|cluster 1)/[P(record|cluster 1)+P(record|cluster 2)+P(record|cluster 3)]. Weight in cluster 2=P(record|cluster 2)/[P(record|cluster 1)+P(record|cluster 2)+P(record|cluster 3)]. Weight in cluster 3=P(record|cluster 3)/[P(record|cluster 1)+P(record|cluster 2)+P(record|cluster 3)]. Here P(record|cluster #) is given as above.

Figure 5:
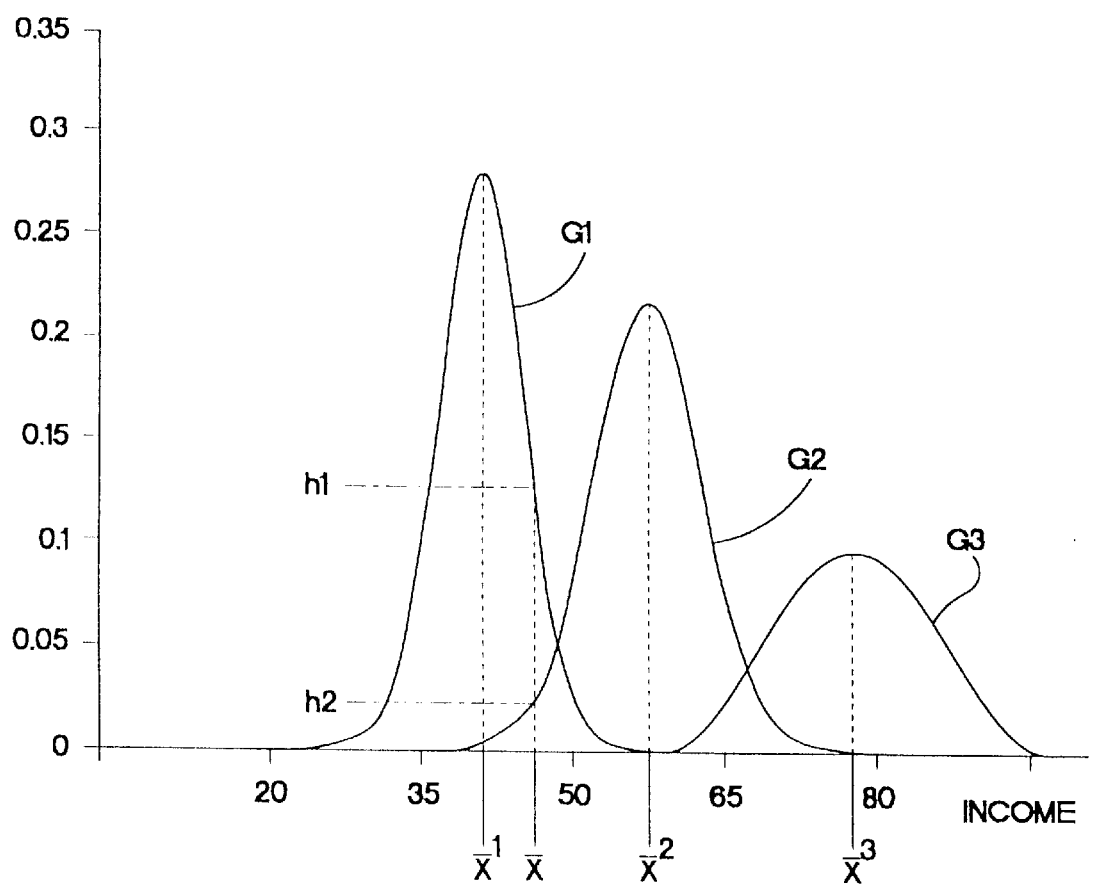
FIG. 5 is a depiction of three clusters over a single, continuous attribute showing their relative positions on a one dimensional scale.

FIG. 5 depicts three Gaussian distribution curves. One dimension is plotted for simplicity, but note that the height of a given Gaussian curve is the p([income,age]|cluster #). The Gaussian data distributions G1, G2, G3 summarize data clusters having centroids or means $\bar{x}^1$, $\bar{x}^2$, $\bar{x}^3$ and represent the distributions over the continuous attributes in the 3 clusters in our example. The compactness of the data is generally indicated by the shape of the Gaussian and quantified by the corresponding covariance value and the average value of the cluster is given by the mean.

Now consider the data point identified along the axis as the point "X" having an annual income=$46,000 from RecordID#2. RecordID#2 'belongs' to all three of the clusters described by the three Gaussians G1, G2, G3 and the attribute/value probability table associated with each cluster for the discrete attributes. Note that the height of this data point under Gaussian G3 is negligible, but call this height h3. Suppose the height of this data point under Gaussian G2 is h2 and the height of this data point under Gaussian G1 is h1. Then the probability that RecordID#2 is in cluster 1 is determined by the height h1, the values of the attribute/value probability table for cluster 1 and the number of data points represented by cluster 1. The value is computed as (fraction of data points represented by cluster 1)*(P(RecordID#2|cluster 1)=(fraction of data points represented by cluster 1)*(P(DiscAtt#1=Blue|cluster 1))*(P(DiscAtt#2=Sedan|cluster 1)*P(DiscAtt#3=female|cluster 1)*p([46K, 47 yrs]|$\mu$, $\Sigma$ of cluster 1)=(3.0/10.0)*(0.2)*(0.5)*(0.7)*h1. Similarly, the probability that this record is in cluster 2=(fraction of data points represented by cluster 2)*P(record ID#2 cluster 2)=(4.5/10.0)*(0.1)*(0.1)*(0.35)*h2. The probability that this record is in cluster 3 is (fraction of data points represented by cluster 3)*P(record ID#2|cluster 3)= (2.5/10.0)*(0.25)*(0.35)*(0.55)*h3. Then the weight of this data point in cluster 1 is Weight1=[(3.0/10.0)*P(record ID#2|cluster 1)]/[(3.0/10.0)*P(record ID#2|cluster 1)+(4.5/10.0)*P(record ID#2|cluster 2)+(2.5/10.0)*P(record ID#2|cluster 3)]. Similarly, the weight of this data point in cluster 2 is Weight2=[(4.5/10.0)*P(record ID#2|cluster 2)]/[(3.0/10.0)*P(record ID#2|cluster 1)+(4.5/10.0)*P(record ID#2|cluster 2)+(2.5/10.0)*P(record ID#2|cluster 3)]. And the weight of this data point in cluster 3 is Weight3=[(2.5/10.0)*P(record ID#3|cluster, 1)]/[(3.0/10.0)*P(record ID#2|cluster 1)+(4.5/10.0)*P(record ID#2|cluster 2)+(2.5/10.0)*P(record ID#2|cluster 3)].

The weights Weight1, Weight2 and Weight3 indicate the "degree of membership" of record ID#2 has in each of the 3 clusters. Knowing these weights the probability tables are updated as described above and the values of $\mu$ and $\Sigma$ are updated in the cluster model.

Overview of Scalable Clustering

FIG. 4 is a flow chart of the process steps performed during a scalable clustering analysis of data in accordance with the present invention. As described in the parent application to Fayyad et al, when only continuous data attributes are used for clustering, during an initialization step 100, the data structures shown in FIGS. 6A–6D are initialized. When mixed discrete and continuous data attributes are contained in the data records, the FIG. 6 data structures are augmented with probability tables P (one for each cluster) as seen in FIGS. 8A–8D.

Clustering is initiated by obtaining 110 a sample data portion from the database 10 and bringing that data portion into a random access memory (into RAM for example, although other forms of random access memory are contemplated) of the computer 20 shown in FIG. 1. A data structure 180 for data having both discrete and continuous fields is shown in FIG. 8C to include a number r of records having a number of attributes D=n+d where there are n continuous attributes and d discrete attributes.

The gathering of data can be performed using either a sequential scan that uses only a forward pointer to sequentially traverse the data or an indexed scan that provides a random sampling of data from the database. When using the index scan it is a requirement that data not be accessed multiple times. This can be accomplished by marking data tuples to avoid duplicates, or a random index generator that does not repeat. In particular, it is most preferable that a first iteration of sampling data be done randomly. If it is known the data is random within the database then sequential scanning is acceptable. If it is not known that the data is randomly distributed, then random sampling is needed to avoid an inaccurate representative of the database.

Figure 8A:
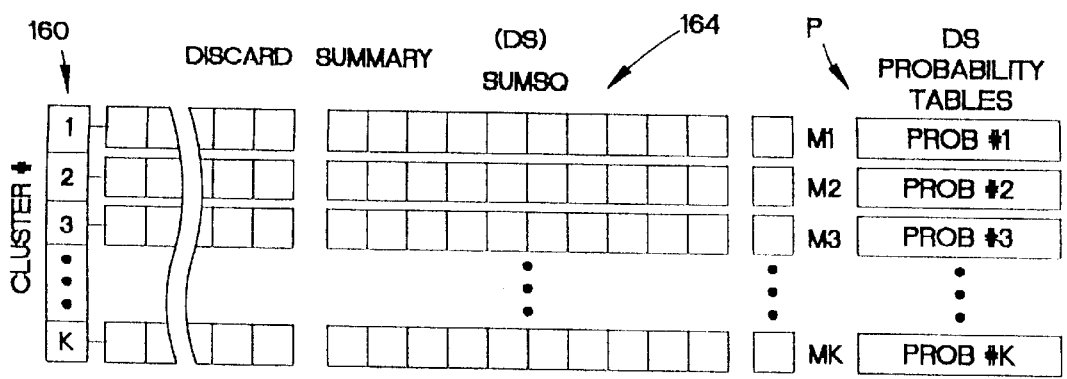
FIGS. 8A–8D are data structures used in computing a clustering model from a database having both continuous and discrete attributes.
Figure 8B:
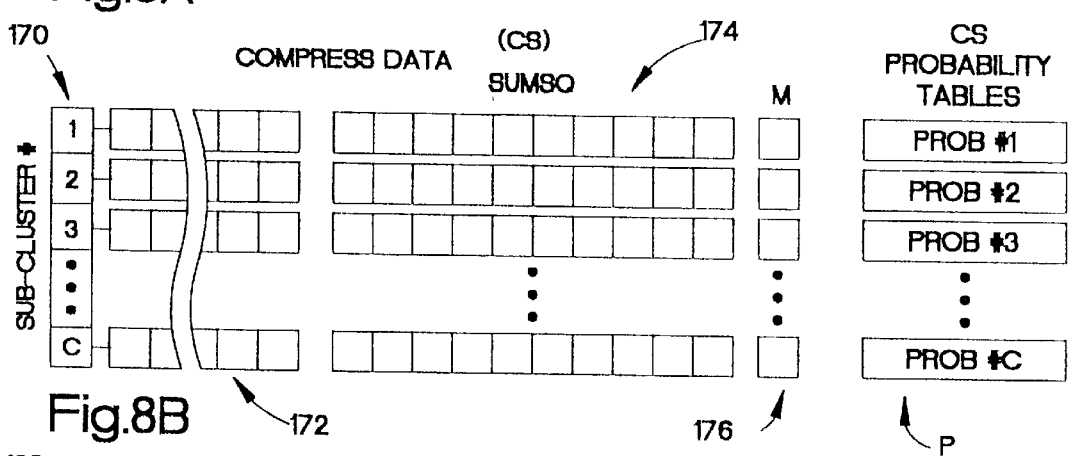
Figure 8C:
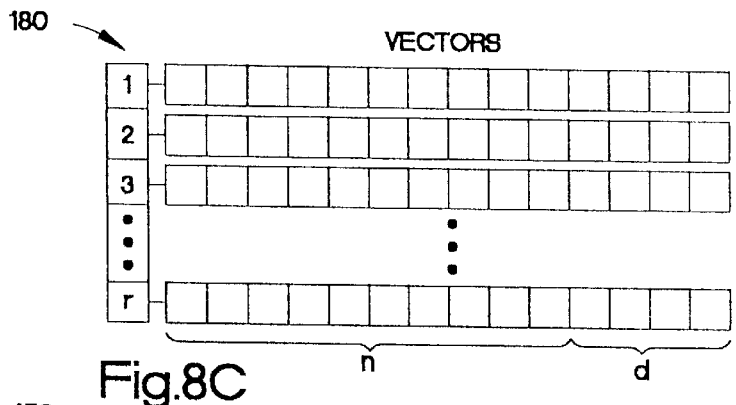
Figure 8D:
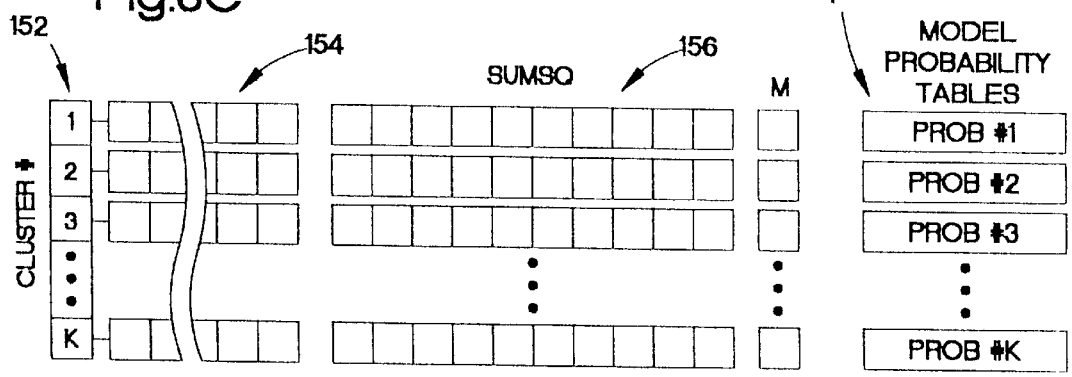

A processor unit 21 of the computer 20 next performs a clustering procedure 120 using the data brought into memory in the step 110 as well as compressed data in two data structures CS, DS (FIGS. 8A, 8B). In accordance with an exemplary clustering process the processor unit 21 assigns data contained within the portion of data brought into memory to a cluster for purposes of recalculating the cluster probabilities for the discrete data attributes and the Gaussian mean and covariance matrix for the continuous data attributes.

A data structure for the results or output model of the analysis for the ordered attributes is depicted in FIG. 8D. This model includes K data structures for each cluster. Each cluster is defined by 1) a vector 'Sum' representing the sum of each of the database records for each of the ordered or continuous attributes or dimensions (n=number of continuous attributes), 2) a vector 'Sumsq' representing the sum of the continuous attributes squared, 3) a floating point value 'M' counting the number of data records contained in or belonging to the corresponding cluster, and 4) an attribute/value probability table such as the table depicted in FIG. 9A, summarizing the discrete attributes (d=number of discrete attributes).

The parameters represented in the data structures (FIG. 8D) enable the data mining engine to assign a probability of cluster membership for every data record read from memory. The scalable clustering process needs this probability to determine data record membership in the DS, CS, and RS data sets (discussed below), as part of a data compression step 130.

A data compression step 130 in the FIG. 4 flowchart summarizes at least some of the data gathered in the present iteration. This summarization is contained in the data structures DS, CS of FIGS. 8A and 8B. If the loop iteration in the FIG. 4 process does not produce a satisfactory model (as described below) these RS, DS, and CS data structures are used to update the model of FIG. 8D during a next loop iteration. The summarization into the DS and CS structures takes significantly less storage in a computer memory 25 than the vector data structure (FIG. 8C) needed to store individual records. Storing a summarization of the data in the data structures of FIGS. 8A and 8B frees up more memory allowing additional data to be sampled from the database 10.

Before looping back to get more data at the step 110, the processor 21 determines 140 whether a stopping criteria has been reached. One stopping criteria that is used is whether the analysis has produced a sufficient model (FIG. 8D) by a standard that is described below. A second stopping criterion has been reached if all the data in the database 10 has been used in the analysis.

One feature of the invention is the fact that instead of stopping the analysis, the analysis can be suspended. Data in the data structures of FIG. 8A–8D can be saved (either in memory or to disk) and the scalable clustering analysis can then be resumed later. This allows the database 10 to be updated and the analysis resumed to update the clustering statistics without starting from the beginning. It also allows another process to take control of the processor 21 without losing the state of the clustering analysis. The suspension could also be initiated in response to a user request that the analysis be suspended by means of a user actuated control on an interface presented to the user on a monitor 47 while the Clustering analysis is being performed.

Perturbation Data Compression

The present data clustering process is particularly useful for clustering large databases. The process frees up memory so that more data from the database can be accessed. This is accomplished by compressing data and storing sufficient statistics for compressed data in the memory thereby freeing up memory for the gathering of more data from the database. For each of the K clusters a confidence interval on the Gaussian mean is defined for each of the continuous attributes and a confidence interval is defined for each value in the attribute/value probability table for the discrete attributes. Appendix A describes one process for setting up a confidence interval oil the multidimensional Gaussian means associated with the continuous attributes of the K clusters.

Consider the example of five attributes of color, style, sex, income and age from table 3. For the discrete attributes such as color, the model (FIG. 8D) includes probabilities for each attribute value (See FIG. 9A) in the range of between 0.0 and 1.0. When determining which of the data records can safely be compressed, the data mining engine 12 sets up a confidence interval that brackets these probabilities.

| For color: | | | |
| --- | --- | --- | --- |
| Red | Blue | Green | White |
| .1 +/− .005 | .2 +/− .005 | .5 +/− .01 | .2 +/− .008 |
| For Style: | | | |
| Sedan | sport | truck | |
| .5 +/− .007 | .4 +/− .003 | .1 +/− .002 | |
| For sex: | | | |
| Male | Female | | |
| .3 +/− .05 | .7 +/− .05 | | |

Confidence intervals are also set up for the continuous attributes for each of the clusters. Assume that for cluster #1 the mean income attribute is $40,000 and the confidence interval is $1500 above and below this value. The age attribute confidence interval for cluster #1 is 45 yrs+/−2.

Now consider the second data record. As calculated above, this data record was assigned to cluster #1 with highest probability of membership. The perturbation technique determines whether to compress a record into the DS data structure (FIG. 8A) by adjusting the probabilities of the cluster to which the record is assigned so that the probability of membership in this "adjusted" cluster is decreased (lowers the attribute/value probabilities within the confidence interval for the discrete attributes and shifts the cluster mean away from the data record for the continuous attributes) and adjusts the probabilities and means of the clusters to which the data record is not assigned so that the probability of membership in these "adjusted" clusters is increased by raising the attribute/value probabilities and shifting the mean toward the data record for the continuous attributes. This process maximizes the possibility that the RecordID #2 will be assigned to a different cluster with highest probability of membership.

With these temporary adjustments, the calculations for the data record membership are again performed. If the data record (RecordID #2) does not change cluster membership (maximum probability of cluster membership is the original cluster) the sufficient statistics for this data record can be safely added to the DS data structure in FIG. 8A. The adjusted attribute/value probabilities and cluster means are returned to their original state.

Assume Record Id #2 is compressed at this stage. The record is removed from the RS list of records, and its attribute values are used to form the sufficient statistics contained in the set DS associated with the cluster with highest probability of membership of RecordID#2. The DS data structure consists of Gaussian sufficient statistics (Sum, Sumsq,M) summarizing the values of continuous attributes and an attribute/value probability table summarizing the values of the discrete attributes (See FIG. 8A). The processing step 130 visits each record, attempts to compress that record and if the record can be compressed the vectors of SUM, SUMSQ, and M and the attribute/value probability tables P are all updated. The tables P associated with the DS and CS data structures now contain sufficient statistics of discrete attributes for compressed records that are removed from memory.

Thresholding Data Compression

A second data compression process is called thresholding. One can sort all the data points falling within a given cluster based on the probability assigned to them i.e. (fraction of data points represented by cluster 1)*p(discrete$_{r1}$|cluster#1) *p(discrete$_{r2}$|cluster1)* . . . p(descrete$_{rd}$|cluster#1)*p (continuous$_r$|$\mu$,$\Sigma$of cluster #1) and choose for compression into the DS dataset the data points having the highest probability of membership. An additional alternate threshold process would be to take all the data points assigned to a cluster and compress into DS all the data points where the product of the probabilities is greater than a threshold value.

Subclustering

The subclustering is done after all possible data records have been compressed into the DS data structure. The remaining candidates for summarization into the CS data structures (FIG. 8B) are first filtered to see if they are sufficiently "close" to an existing CS subcluster or, equivalently their probability of membership in an existing CS subcluster is sufficiently high. If not, a clustering is performed using random starting-conditions. Subclusters lacking a requisite number of data points are put back in RS and the remaining subclusters are merged.

Assume that the set RS (FIG. 8C) consists of singleton data points and the compressed points have been removed from the RS dataset and have been summarized in the DS data set, contributing to the values of Sum, Sumsq, M, and the attribute/value probability table in the DS structure. Let m be the number of singleton data elements left in RS. Set CS_New=empty. Set k' to be number of subcluster candidates to search for. Randomly choose k' elements from RS to use as an initial starting point for a classic EM clustering. Run classic EM with harsh assignments over the data remaining in RS with the initial point. Harsh assignments in classic EM can be accomplished by assigning a data record with weight 1.0 to the subcluster with highest probability of membership and not assigning it to any other subcluster. This procedure will determine k' candidate subclusters. Set up a new data structure CS_New to contain the set of sufficient statistics, including attribute/value probability tables for the discrete attributes of records associated with the k' candidate subclusters determined in this manner. For each set of sufficient statistics in CS_New, if the number of data points represented by these sufficient statistics is below a given threshold, remove the set of sufficient statistics from CS_New and leave the data points generating these sufficient statistics in RS.

For each set of sufficient statistics in CS_New remaining, if the maximum standard deviation along any continuous dimension of the corresponding candidate subcluster is greater than a threshold $\beta$, or the maximum standard deviation of an entry in the attribute/value probability table is greater than $\beta/2$ ($\beta$ in the range [0,1]), remove the set of sufficient statistics from CS_New and keep the data points generating these sufficient statistics in RS. The value of $\beta/2$ is derived as follows: the standard deviation of a probability p is sqrt(p*(1.0−p)). This value is maximized when p=0.5 in which case sqrt(p*(1.0−p))=sqrt(0.25)=0.5. Hence, in the worst case, the standard deviation is 0.5. Since $\beta$ takes values between [0,1], wethreshold the standard deviation of the probability by $\beta/2$.

Set CS_Temp=CS_New ∪CS. Augment the set of previously computed sufficient statistics CS with the new ones surviving the filtering in steps 6 and 7. For each set of sufficient statistics s (corresponding to a sub-cluster) in CS_Temp Determine the s', the set of sufficient statistics in CS_Temp with highest probability of membership in the subcluster represented by s.

If the subcluster formed by merging s and s', denoted by merge(s, s') is such that the maximum standard deviation along any continuous dimension is less than $\beta$ or the maximum standard deviation of an entry in the attribute/value probability table is greater than $\beta/2$ ($\beta$ in the range [0,1]), then add merge(s, s') to CS_Temp and remove s and s' from CS_Temp.

Set CS=CS_Temp. Remove from RS all points that went into CS, (RS=RS−CS.) Note that the vectors Sum, Sumsq, values of M and the attribute/value probability tables for the newly-found CS elements were determined in the subclustering process or in the merge processes. Note that the function merge(s,s') simply computes the sufficient statistics for the sub-cluster summarizing the points in both s and s' (i.e. computes Sum, Sumsq, M, attribute value probabilities the sub-cluster consisting of points in s and s').

Data Structures

Data structures used during performance of the clustering evaluation are found in FIGS. 8A–8D. An output or result of the clustering analysis is a data structure designated MODEL which includes an array 152 of pointers to a first vector 154 of n elements (floats) designated 'SUM', a second vector 156 of n elements (floats) designated 'SUMSQ', and a single floating point number 158 designated 'M' and an attribute/value probability table P (entries are floats) such as the table of FIG. 9A. The number M represents the number of database records represented by a given cluster. The model includes K entries, one for each cluster.

The vector 'SUM' represents the sum of the weighted contribution of each of the n continuous database record attributes that have been read in from the database. As an example a typical record will have a value of the ith dimension which contributes to each of the K clusters. Therefore the i-th dimension of that record contributes a weighted component to each of the k SUM vectors. A second vector 'SUMSQ' is the sum of the squared components of each record which allows straightforward computation of the diagonal elements of the covariance matrix. In a general case the SUMSQ could be a full n×n matrix, allowing the computation of a full n×n covariance matrix. It is assumed for the disclosed exemplary embodiment that the off diagonal elements are zero. A third component of the model is a floating point number 'M'. The number 'M' is determined by totaling the probability of membership for a given cluster over all data points. These structures (vectors SUM, SUMSQ, value M and attribute/value probability table) constitute the model output from the EM process for a given cluster K.

An additional data structure designated DS in FIG. 8A includes an array of pointers 160 that point to a group of K vectors (the cluster number) of the n continuous attribute elements 162 designated 'SUM', a second group of K vectors 164 designated 'SUMSQ', a group 166 of k floats designated M, and an attribute/value probability table P such as the table shown in FIG. 9A. This data structure is similar to the data structure of FIG. 8l) that describes the MODEL. It contains sufficient statistics of the continuous and discrete attribute values for a number of data records that have been compressed into the FIG. 8A data structure shown rather than maintained as individual records (FIG. 8C) in memory. Compression of the data into this data structure and the CS data structure described below frees up memory for accessing other data from the database at the step 110 on a next subsequent iteration of the FIG. 4 clustering process.

Figure 6A:
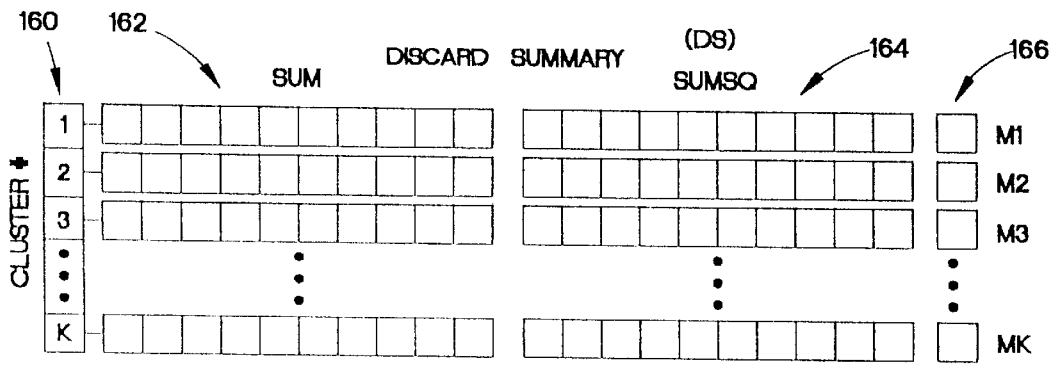
FIGS. 6A–6D are data structures described in the parent application that are used in computing a model summary for data clusters based on data having only continous attributes.
Figure 6B:
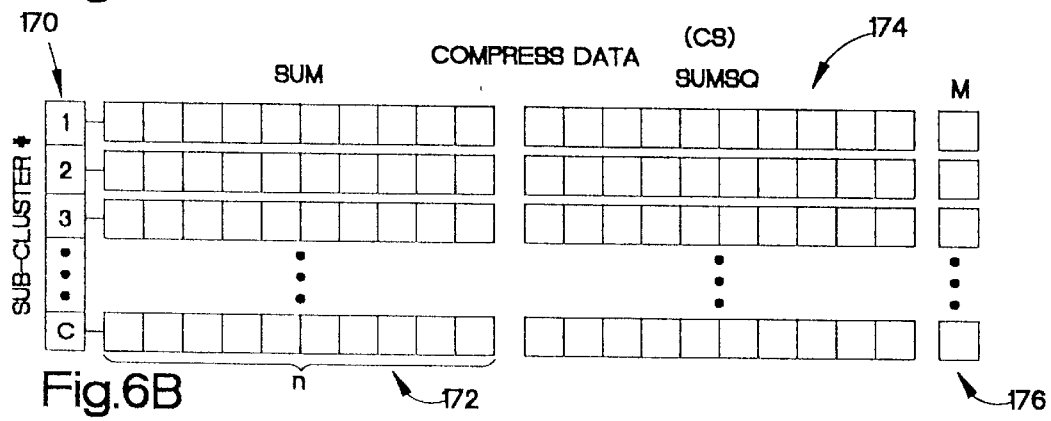
Figure 6C:
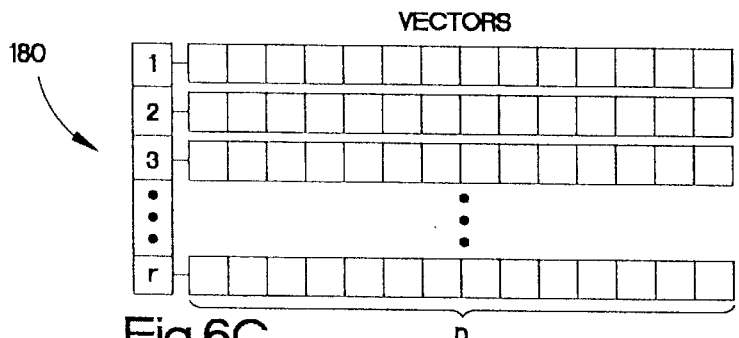
Figure 6D:
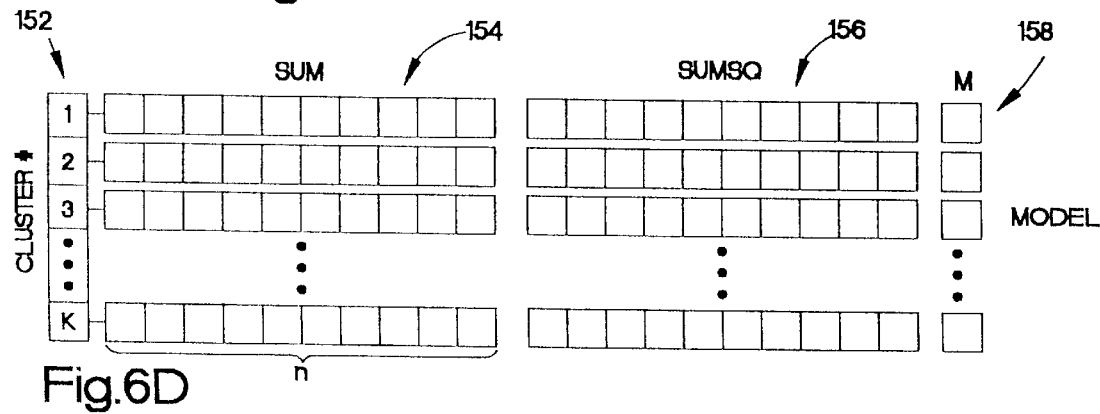

A further data structure designated CS in FIG. 6B is an array of c pointers where each pointer points to an element which consists of a vector of n elements (floats) designated 'SUM', a vector of n elements (floats) designated 'SUMSQ', and a scalar 'M'. Again, an attribute/value probability table summarizes the discrete attributes of the points compressed into CS elements. The data structure CS also summarizes multiple data points into structures similar to the MODEL data structure and represents a subcluster of data records.

As noted previously, the data structure designated RS (FIG. 6C) is a group of r vectors having D=d+n dimensions that includes both continuous attributes (n continuous attributes) and discrete attributes (d discrete attributes). As data is read in from the database at the step 110 it is initially stored in the set RS and then used to update the cluster model. It is the updated model of FIGS. 8A–8D that is used in determining which records in RS should be summarized in RS and CS.

Figure 7A:
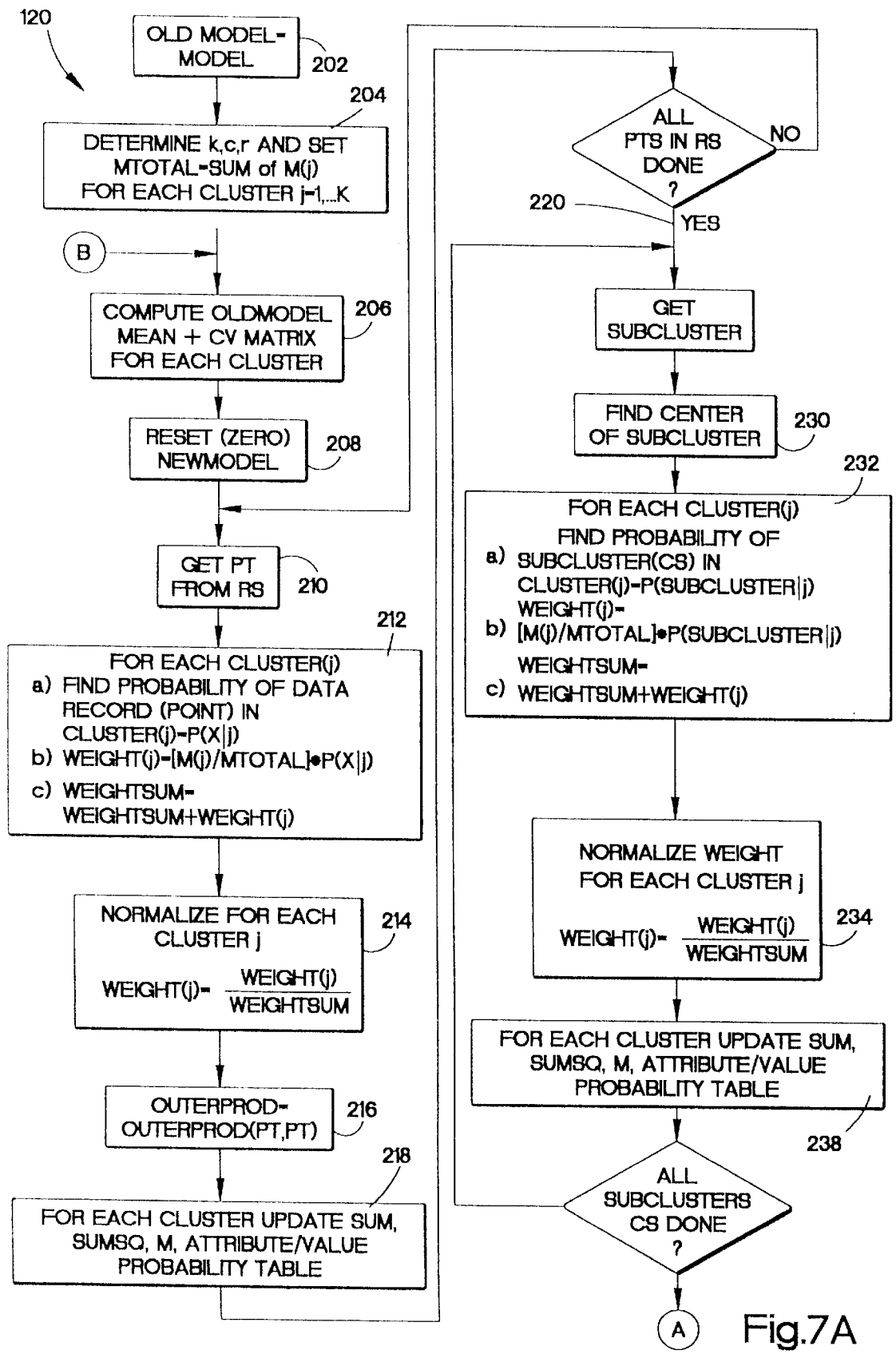
FIGS. 7A and 7B are flow charts of a preferred clustering procedure for use with data having mixed continuous and discrete data.
Figure 7B:
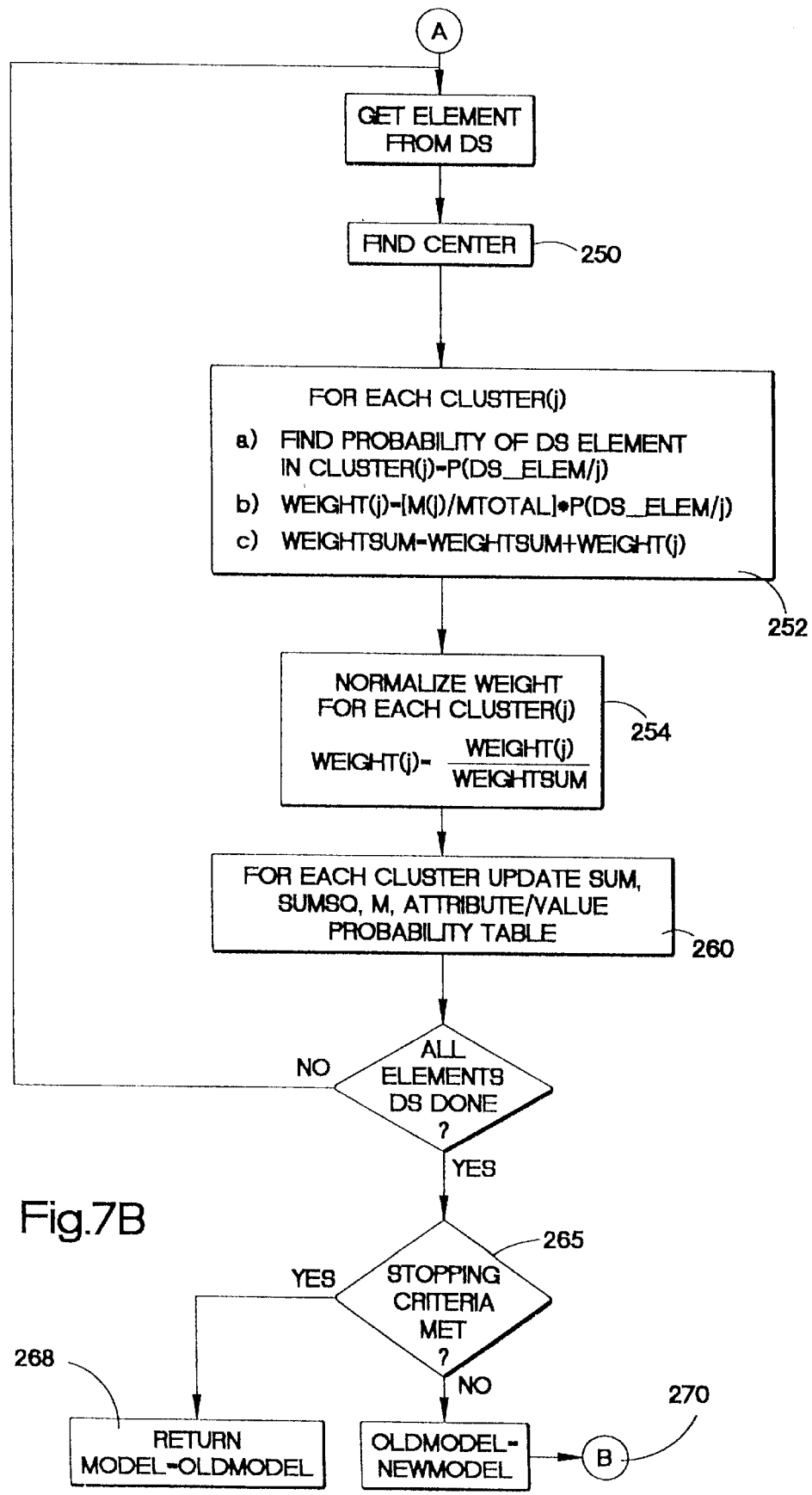

Extended Clustering Procedure of FIGS. 7A and 7B

The extended clustering procedure 120 (FIGS. 7A and 7B) takes the contents of the three data structures RS, DS, CS, stored in the data structures of FIGS. 8A, 8B, 8C and produces a new model. The new model (including the updated cluster attribute/value probability tables P) is then stored in place of the old model (FIG. 8D).

The data structures of FIG. 8A–8D are initialized 100 (FIG. 4) before any data is read from the database 10. In order for the clustering procedure 120 to process the first set of data read into the memory, the MODEL data structure of FIG. 8D that is copied into the Old_Model data structure is therefore not null. An initial set of K cluster means or centroids are chosen and one procedure for this initialization is to randomly choose the means and place them in the vector 'Sum' while setting M=1.0. Arbitrary values are chosen as diagonal members (SUMSQ) of the starting model's K covariance matrices. The diagonal values of the starting matrices are chosen to range in size from 0.8 to 1.2 for data in which the continuous attributes have been normalized into a range [−5,5]. An initial attribute/value probability table for each cluster is also arbitrarily assigned on the first iteration. One approach may be to set all attribute values equally likely.

The clustering procedure 120 staffs by copying the existing model to create 202 an Old_Model in a data structure like that of FIG. 8D. The process next determines 204 the length of the pointer arrays of FIGS. 8C–8C, and computes the total number of data records summarized by the Old_Model, and computes 206 means and covariance matrices from the Old_Model SUM, SUMSQ and M data from the continuous data. The set of Old_Model means and covariance matrices that are derived from this calculation are stored as a list of length K where each element of the list includes two parts:

1) a vector of length n (called the "mean"which stores the mean of the corresponding Gaussian or cluster
2) a matrix of size n×n (called the "CVMatrix"which stores the values of a covariance matrix of the corresponding Gaussian or cluster.

The means and covariance matrices are referred to below as "Old_SuffStats".

To compute the matrix CVMatrix for a given cluster from the sufficient statistics SUM, SUMSQ and M (in FIG. 8D), the clustering procedure computes an outer product defined for 2 vectors OUTERPROD(vector1, vector2). The OUTERPROD operation takes 2 vectors of length n and returns their outer product, or the n×n matrix with an entry in row h and column j being vector1(h)*vector2(j). A DETERMINANT function computes the determinant of a matrix. The step 206 also uses a function, INVERSE that computes the inverse of a matrix. A function TRANSPOSE returns the transpose of a vector (i.e. changes a column vector to a row vector). A function EXP(z) computes the exponential $e^z$.

A function 'ConvertSuftats' calculates 206 the mean and covariance matrix from the sufficient statistics stored in a cluster model (SUM,SUMSQ,M) for the continuous attributes.

[Mean,CVMatrix]=ConvertSuffStats(SUM,SUMSQ,M)
Mean=(1/M)*SUM:
MSq=M*M;
OutProd=OUTERPROD(SUM,SUM);
CVMatrix=(1/MSq)*(M*SUMSO−3*OutProd);

A function designated 'GAUSSIAN' defined below is used at a step 212 (FIG. 7A) to compute the height of the Gaussian curve above a given data point, where the Gaussian has mean=Mean and covariance matrix=CVMatrix.
[height]=GAUSSIAN(x,Mean,CVMatrix)
normalizing_constant=(2*PI)^(n/2)*SQRT(DET(CVMatrix));
CVMatrixInv=INVERSE(CVMatrix);
Height=(1/normalizing_constant)*exp(-(1/2)*(TRANSPOSE(x−Mean))*CVMatrixInv*(x−Mean));
Note, mathematically, the value of GAUSSIAN for a given cluster for the datapoint x is:

$$height = \frac{1}{(2\pi)^{n/2}\sqrt{|CVMatrix|}} \cdot \exp\left(-\frac{1}{2}(x-Mean)^T(CVMatrix)^{-1}(x-Mean)\right)$$

After resetting 208 a New_Model data structure (similar to FIG. 8D) to all zeros, each point of the RS data structure of data records is accessed 210 and used to update the values of Sum, Sumsq, M (summarizing continuous data attributes)

and the attribute/value probability tables derived from the discrete attributes that make up the data structures of the New_Model. A contribution to each of the K clusters is determined for each of the data points in RS by determining the weight (equivalent to the probability of membership in each cluster) of each point under the old model. A weight vector has K elements weight(1), weight(2), ... weight(K) where each element indicates the normalized or fractional assignment of the data point to the corresponding cluster. Recall that each data record contributes to all of the K clusters that were set up during initialization. The mean and covariance matrix structures allow a height contribution for each record (for j=1, ..., r) to be determined at step 212 of the extended EM procedure 120 for each cluster (for 1= 1, ..., K). The attribute/value probability tables provide the contribution to the weight (probability of membership) calculation over the discrete attributes. This height contribution and the contribution from the attribute/value probability table is then scaled to form a weight contribution that takes into account the fraction of data points assigned to cluster 1: $M_1$/ MTotal where MTotal is the total number of data records read thus far from the database.

Normalizing the weight factor is performed at a step 214 of the procedure. At a step 216 an outer product is calculated for the relevant vector data point in RS. An update step 218 loops through all K clusters to update the new model data structure by adding the contribution for each data point:

```
for j = 1, ..., K
    New_Model(j).SUM = New_Model(j).SUM +
            weight(j)*center;
    New_Model(j).SUMSQ = New_Model(j).SUMSQ +
            Weight(j)*OuterProd;
    New_Model(j).Attribute_Value_Table(row i, column h) =
        [(New_Model(j).M)*New_Model(j).Attribute_Value_T
        able(row i, column h) + Weight(j)]/[New_Model(j).M +
        Weight(j)] if the data point under consideration has
        value h for discrete attribute i. Otherwise
        New_Model(j).Attribute_Value_Table(row i, column h)
        =
        [(New_Model(j).M)*New_Model(j).Attribute_Value_T
        able(row i, column h)]/[New_Model(j).M + Weight(j)].
    New_Model(j).M = New_Model(j).M + Weight(j);
End for
```

The probability table of the New_Model is updated as described above, one record at a time.

The process of updating the data structures of the New_Model continues for all points in the RS data structure. On the first pass through the procedure, the data structures DS and CS are null and the RS structure is made up of data read from the database. Typically a portion of the main memory of the computer 20 (FIG. 1) is allocated for the storage of the data records in the RS structure. On a later iteration of the processing loop of FIG. 4, however, the data structures DS, CS are not null. To free up space for a next iteration of data gathering from the database, some of the data in the structure RS is summarized and stored in one of the two data structures CS or DS. (FIGS. 8A, 8B)

After each of the single points in the RS structure has been used to update the model, a branch 220 is taken to begin the process of updating the New_Model data structure for all the subclusters in CS. A contribution is determined for each subcluster CS (denoted as CS_Elem) by determining 230 the weight of each subcluster under the old model (determining probability of membership of the CS subcluster in a given model cluster). First a center vector for the subcluster for the continuous attributes is determined 230 from the relation center=(1/CS_Elem.M)*CS_Elem.SUM. The probability of membership of the CS element in a given cluster, say cluster #1, is then computed as (fraction of data points in cluster #1)*[(P(DiscAttr#1=Val11|cluster #1))^(CS_Elem.M*CS_Elem.Attribute_Value_Table(1,1))*P(DiscAttr#1=Val12|cluster #1))^(CS_Elem.M*CS_Elem.Attribute_Value_Table(1,2))* . . . *P(DiscAttr#1=Val1(V(1))|Cluster #1)^(CS_Elem.M*CS_Elem.Attribute_Value_Table(1, V(1))*P(DiscAttr#2=Val21)^(CS_Elem.M*CS_Elem.Attribute_Value_Table(2,1))* . . . *P(DiscAttr#=Vald(V(d))|Cluster #1))^(CS_Elem.M*CS_Elem.Attribute_Value_Table(d,t))]*(Gaussian(center,Mean of cluster 1, CV matrix of cluster 1)). In the above, we assume that discrete attribute i has V(i) possible values.

A weight vector has K elements weight(1), weight(2), ... weight(K) where each element indicates the normalized or fractional assignment of a given subcluster to a cluster. This weight is determined 232 for each cluster and the weight factor is normalized at a step 234 of the procedure. An update step 238 for the subcluster of CS loops through all K clusters:

```
for j = 1, ..., K
    New_Model(j).SUM = New_Model(j).SUM +
            Weight(j)*CS_Elem.SUM;
    New_Model(j).SUMSQ = New_Model(j).SUMSQ +
            Weight(j)*CS_Elem.SUMSQ;
    New_Model(j).Attribute_Value_Table(row i, column h) =
        [(New_Model(J).M)*New_Model(j).Attribute_Value_T
        able(row i, column h)+
        Weight(j)*CS_Elem.M*CS_Elem.Attribute_Value_Tab
        le(row i, column h)]/[(New_Model(j).M +
        Weight(j)*CS_Elem.M], for all rows i and all columns
        h in the Attribute_Value_Table.
    New_Model(j).M = New_Model(j).M = weight(j) *
            CS_Elem.M;
End for
```

The probability table CS_Elem.Attribute_Value_Table is combined with the updated probability table for the new model, New_Model(j).Attribute_Value_Table based on the number of records summarized by the subcluster and the values in the subcluster attribute/value probability table.

When the contribution of all the subclusters whose sufficient statistics are contained in CS have been used to update the New_Model, a branch 240 is taken to update the New_Model using the contents of the data structure DS. A center for each of the k entries of DS is determined 250 from the relation center=(1/DS_Elem.M)*DS_Elem.SUM. A weight of this DS structure is then determined under the Old_Model in exactly the same fashion as the weights were determined for the CS structures above and the weight is normalized 254. The contributions of each of the subclusters is then added 260 to the sufficient statistics of the New_Model:

```
for j = 1, ..., K
    New_Model(j).SUM = New_Model(j).SUM +
            Weight(j)*DS_Elem.SUM;
    New_Model(j).SUMSQ = New_Model(j).SUMSQ +
            Weight(j)*DS_Elem.SUMSQ;
```

-continued

```
New_Model(j).Attribute_Value_Table(row i, column h) =
    [(New_Model(j).M)*New_Model(j).Attribute_Value_Table(ro
    w i, column h) +
    Weight(j)*DS_Elem.M*DS_Elem.Attribute_Value_Table(row
    i, column h)]/[New_Model(j).M + Weight(j)*DS_Elem.M], for
    all rows i and all columns h in the Attribute_Value_Table.
New_Model(j).M = New_Model(j).M + weight(j) * DS_Elem.M;
End for
```

After the New_Model has been updated at the step 260 for each of the K clusters, the extended EM procedure tests 265 whether a stopping criteria has been met. This test begins with an initialization of three variables CV_dist=0, mean_dist=0, Ptable_dist=0. For each cluster a new co-variance matrix is calculated and a distance from the old mean and the new mean as well as a distance between the new and old covariance matrices is determined for the continuous attributes. Similarly, a distance between probability tables is calculated. These values are totaled for all the clusters:

```
For j = 1, . . ., K
    [New_Mean, New_CVMatrix] = ConvertSuffStats(
        New_Model(j).SUM, New_model(j).SUMSQ,
        New_Model(j).M);
    mean_dist = mean_dist +
        distance(Old_SuffStats(j).Mean,New_mean);
    CVDist = CV_dist + distance(Old_SuffStats(j).CVMatrix,
        New_CVMatrix);
    Ptable_dist = Ptable_dist +
    distance(Old_Model(j).Attribute_Value_Table,
        New_Model(j).Attribute_Value_Table).
    End for
```

The distance between attribute/value probability tables may be computed by summing the absolute values of the differences of the table entries and dividing by the total number of entries in the attribute/value table.

The stopping criteria determines whether the sum of these two numbers and the absolute difference in probability tables summarizing the discrete attributes is less than a stopping criteria value:

$$[(1/(3*k))*(mean\_dist+CV\_dist+Ptable\_dist)] < stop\_tol$$

If the stopping criteria is met the New_Model becomes the Model and the procedure returns 268. Otherwise the New_Model becomes the old model and the procedure branches 270 back to recalculate another New_model from the then existing sufficient statistics in RS, DS, and CS.

Stopping Criteria at Step 140

The scalable Expectation Maximization analysis is stopped (rather than suspended) and a resultant model output produced when the test 140 of FIG. 4 indicates the Model is good enough. Two alternate stopping criteria (other than a scan of the entire database) are used.

A first stopping criteria defines a probability function p(x) to be the quantity $$p(x) = \sum_{i=1}^{K} \frac{M(l)}{N} (g(x|l))$$

where x is a data point or vector sampled from the database and 1) the quantity M(1) is the scalar weight for the lth cluster, (The number of data elements from the database sampled so far represented by cluster 1) 2)N is the total number of data points or vectors sampled thus far, and 3) g(x|l) is the probability function for the data point for the lth cluster. The value of g(x|l) is the product of the height of the Gaussian distribution for cluster 1 evaluated over the continuous attribute values times the product of the values of the attribute/value table associated with cluster 1 taking the values of the attributes appearing in x.

Now define a function f(iter) that changes with each iteration.

$$f(iter) = \frac{1}{M} \sum_{i=1}^{M} \log p(x_i)$$

The summation in the function is over all data points and therefore includes the subclusters in the data structure CS, the summarized data in DS and individual data points in RS. When the values of $p(x_i)$ are calculated, the probability function of a subcluster is determined by calculating the weighting factor in a manner similar to the calculation at step 232. Similarly the weighting factor for the k elements of DS are calculated in a manner similar to the step 252 in FIG. 8B. Consider two computations during two successive processing loops of the FIG. 4 scalable EM analysis. Designate the calculations for these two iterations as $f_z$ and $f_{z-1}$. Then a difference parameter $d_z=f_z-f_{z-1}$. Evaluate the maximum difference parameter over the last r iterations and if no difference exceeds a stopping tolerance ST then the first stopping criteria has been satisfied and the model is output.

A second stopping criteria is the same as the stopping criteria outlined earlier. Each time the Model is updated K cluster means and covariance matrices are determined and the attribute/value probability tables for the cluster are updated. The variables CV_dist, mean_dist and Ptable_dist are initialized. For each cluster k the newly determined covariance matrix, mean, and attribute/value probability table are compared with a previous iteration for these parameters. A distance between the old mean and the new mean as well as a distance between the new and old covariance matrices and distance between old and new attribute/value probability tables Are determined. These values are totaled for all the clusters:

```
For j = 1, . . ., K
    [(New_Mean, New_CVMatrix] = ConvertSuffStats(
        New_Model(j).SUM, New_model(j).SUMSQ,
        New_Model(j).M);
    mean_dist = mean_dist +
        distance(Old_SuffStats(j).Mean,New_mean);
    CVDist = CV_dist + distance(Old_SuffStats(j).CVMatrix,
        New_CVMatrix);
    Ptable_dist = Ptable_dist +
    distance(Old_Model(j).Attribute_Value_Table,
        New_Model(j).Attribute_Value_Table).
    End for
```

The stopping criteria determines vhether the sum of these numbers is less than a stopping criteria value:

$$[(1/(3*k))*(mean\_dist+CV\_dist+Ptable\_dist)] < stop\_tol$$

Computer System

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (RTOM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

Appendix A

The following development of the Bonferoni inequality, used to determine the multidimensional confidence interval on the mean follows from page 12 of [2] G. A. F. Seber. *Miultivariate Observations*. John Wiley & Sons, New York, 1984.

A conservative procedure for determining the multidimensional confidence interval on the mean vector of a set of multivariate observations is always available using the Bonferoni inequality:

$$P\left(\bigcap_{i=1}^{r} E_i\right) \geq 1 - \sum_{i=1}^{r} P(\overline{E}_i).$$

Where $\overline{E}_i$ is the complement of $E_i$. If we use the critical level of $\alpha/r$ for each test, then $$P(E_i) = 1 - \frac{\alpha}{r} \Longrightarrow P(\overline{E}_i) = \frac{\alpha}{r}$$

$$P\left(\bigcap_{i=1}^{r} E_i\right) \geq 1 - \sum_{i=1}^{r} P(\overline{E}_i) = 1 - r\left(\frac{\alpha}{r}\right) = 1 - \alpha.$$

Hence, in our application, let $E_j$ be the event that the j-th element of the l-th current mean lies in the between the values. $L_j^l$ (lower bound) and $U_j^l$ (upper bound), or specifically, $L_j^l \leq \overline{x}_j^l \leq U_j^l$. Here $\overline{x}_j^l$ is the j-th element of the l-th current mean. Here the values of $L_j^l$ and $U_j^l$ define the $100(1-\alpha/r)\%$ confidence interval on $\overline{x}_j^l$ which is computed as:

$$L_j^l = \overline{x}_j^l - t_{\left(\frac{\alpha}{2n}\right),(N-1)} \cdot \sqrt{\frac{S_j^l}{N}},$$

$$U_j^l = \overline{x}_j^l + t_{\left(\frac{\alpha}{2n}\right),(N-1)} \cdot \sqrt{\frac{S_j^l}{N}}.$$

N is the number of singleton data points represented by cluster l, including those that have already been compressed in earlier iterations and uncompressed data points. $S_j^l$ is an estimate of the variance of the l-th cluster along dimension j. Let $L^l, U^l \in R^n$ be the vectors of lower and upper bounds oi l the mean of cluster l.

The invention assigns data points (the continuous attributes of data records) to Gaussians in a probabilistic fashion. Two different techniques are proposed for determining the integer N, the number of singleton data points over which the Gaussian mean is computed. The first way is motivated by the EM Gaussian center update formula which is computed over all of the data processed so far (whether it has been compressed or not), hence in the first variant of the Bonferoni CI computation we take N to be the number of data elements processed by the Scalable EM algorithm so far. The second variant is motivated by the fact that although the EM Gaussian center update is over all data points, each data point is assigned probabilistically to a given Gaussian in the mixture model, hence in the second variant of the Bonferoni computations we take N to be the rounded integer of the sum of the probabilistic assignments over all data points processed so far.

The Bonferoni CI formulation assumes that the Gaussian centers, computed over multiple data samples of size N are computed as $$\frac{1}{N}\sum_{i=1}^{N} x^i.$$

This is true for the classic K-means algorithm, but is only guaranteed to be true for the first iteration of the EM algorithm. Hence a distribution other than the t distribution may better fit the assumptions on the distribution of the Gaussian center as computed by the EM algorithm. This would result in a different formula for the Bonferoni CI.

After determining the confidence intervals on the K Gaussian means $L^l, U^l \epsilon R^n, l=1, \ldots, k$, one technique perturbs the means so that the resulting situation is a "worst case scenario" for a given singleton data element. Assuming that the data point is $x^i$, we propose solving the following optimization problem for determining the perturbed cluster means and corresponding probabilistic assignment of data point $x^i$ to the K perturbed Gaussians:

$$\min_{\bar{x}^1, \bar{x}^2, \ldots, \bar{x}^k} \left\{ -\sum_{l=1}^{k} f(\bar{x}^l) \log f(\bar{x}^l) \middle| \sum_{l=1}^{k} f(\bar{x}^l) = 1, L^l \leq \bar{x}^l \leq U^l, l=1, \ldots, k \right\}.$$

Here $f(\bar{x}^l)$ is the probabilistic assignment of data point $x^i$ to the Gaussian centered at $\bar{x}^l$, more specifically:

$$f(\bar{x}^l) = P(l|x^i) = \frac{p(x^i|l)P(l)}{p(x)} = \frac{p(x^i|l)P(l)}{\sum_{j=1}^{k} p(x^i|j)P(j)}, \text{ where}$$

$$p(x^i|l) = \frac{1}{(2\pi)^{n/2}\sqrt{|\tilde{S}^l|}} \exp\left\{-\frac{1}{2}(x^i-\bar{x}^l)^T(\tilde{S}^l)^{-1}(x^i-\bar{x}^l)\right\}.$$

The perturbation becomes a more general optimization problem and the procedure used in the K-mean case is a special case of the solution of this problem when 0/1 assignments are made between points and clusters.

We claim:

1. In a computer data processing system, a method for clustering data in a database comprising the steps of:
   a) reading data records having both discrete and ordered attributes from a database storage medium and bringing a portion of the data records into a rapid access memory;
   b) initializing a cluster model that characterizes the data within the database wherein the cluster model includes a table of probabilities for the enumerated or discrete data attributes of the data records for each cluster of a multiple number of clusters that make up the cluster model and wherein the cluster model for data attributes that are ordered comprises a mean and covariance for each cluster;
   c) updating the cluster model from the database records brought into the rapid access memory;
   d) summarizing at least some of the database records in the rapid access memory and storing a summarization within the rapid access memory;
   e) evaluating a criteria to determine if further data should be accessed from the database to further cluster data records in the database; and
   f) based on the evaluating step reading an additional number of records from the database storage medium and bringing said additional number of records into the rapid access memory for further updating of the cluster model.

2. The method of claim 1 wherein the step of updating the cluster model includes the step of adjusting the table of discrete attribute probabilities for a cluster by calculating a weighted sum of the data records brought into the rapid access memory and a weighted sum for data records already summarized in the cluster model.

3. The method of claim 1 wherein the step of updating the cluster model includes the step of adjusting a data structure of ordered attribute mean and covariance values by calculating a weighted sum of the mean and covariance values of database records brought into the rapid access memory and the mean and covariance values for records already summarized in the cluster model.

4. The method of claim 1 wherein the step of updating the cluster model includes adjusting the ordered attribute mean and spread values and the table of discrete attribute probabilities for a cluster by calculating a weighted sum of the mean and covariance values and probability values of database records brought into the rapid access memory and the mean and covariance values and probability values for records already summarized in the cluster model.

5. The method of claim 1 wherein both the ordered and the discrete attributes are assigned a confidence interval and wherein the summarizing step summarizes certain data records based upon the confidence interval.

6. The method of claim 5 wherein the step of summarizing the database records includes the step of determining whether a data point is suitable for summarization by performing a perturbation of the cluster model probabilities and verifying that the data point is sufficiently described by the perturbed cluster model probabilities.

7. The method of claim 5 wherein the step of summarizing the database records includes the step of determining whether a data point is suitable for summarization by comparing the probability that a data point belongs to a cluster with a threshold probability value.

8. The method of claim 5 wherein the step of summarizing the data base records includes the step of performing a non-scalable clustering method on the data points remaining in rapid access memory after some of the database records have been summarized and storing the results of the non-scalable clustering method in rapid access memory.

9. The method of claim 5 further including the step of constructing a model of the database based on the cluster probability tables, the summarizations of data points in rapid access memory, and data points in rapid access memory which have been neither compressed or summarized.

10. The method of claim 9 wherein the step of constructing a model of the database comprises the steps of:
   a) resetting a new model data structure to zero;
   b) determining a weighted contribution to the new model for each unsummarized data point; and c) determining a weighted contribution of the summarized data points to the new model.

11. The method of claim 10 further comprising the steps of:
   a) providing an old model based upon a past modeling iteration;
   b) comparing the old model to the new model; and
   c) terminating the modeling process when the old model and new model are sufficiently similar.

12. The method of claim 1 wherein a probability that a data record belongs in a cluster for data records extracted from the database is calculated using a covariance matrix for the continuous attributes of the record.

13. The method of claim 1 wherein each cluster in the cluster model is characterized by a datapoint number for the cluster, a mean for each ordered data attribute, a covariance for each ordered data attribute and a probability table for each discrete data attribute and further wherein each data record read from the database storage medium contributes to an updating of the cluster model for at least one cluster.

14. The method of claim 13 wherein there are K clusters in the cluster model and wherein each data record contributes to a cluster model for each of the K clusters.

15. The method of claim 1 wherein the step of accessing database records is performed using a sequential scan of the database.

16. The method of claim 1 wherein the step of accessing database records is performed using a random index generator that does not repeat.

17. In a computer data mining system, apparatus for evaluating data in a database comprising:
   a) one or more data storage devices for storing a database of data records on a storage medium, said data records including attributes of both discrete or enumerated data and ordered data;
   b) a computer having a rapid access memory and an interface to the storage devices for reading data from the storage medium and bringing the data into said rapid access memory for subsequent evaluation; and
   c) said computer comprising a processing unit for evaluating at least some of the data records in the database and for characterizing the data records into multiple numbers of data clusters, said processing unit programmed to retrieve a subset of data from the database into the rapid access memory, evaluate the subset of data to further characterize the database clustering using a clustering criteria, and produce a summarization of at least some of the retrieved data records before retrieving additional data records from the database; said computer producing a cluster model that includes cluster probabilities for the discrete attributes and cluster means and covariance information for the ordered data in the rapid access memory during data clustering.

18. The apparatus of claim 17 wherein said processing unit updates said cluster model criteria based on said subset of said data records and previously summarized data from the database.

19. The apparatus of claim 17 wherein said processing unit is further programmed to summarize certain data and to summarize certain other data according to subclusters having means, covariances, and probability tables characterizing each of said subclusters.

20. The apparatus of claim 17 further comprising an output means for outputting a model of said database created by said characterization of data into clusters.

21. A computer readable medium having stored thereon a data structure, comprising:
   a) a first data portion containing a model representation of data records stored in a database, wherein at least some of the database records include mixed data that includes both discrete data fields and continuous data fields;
   b) a second data portion containing sufficient statistics of a portion of the data records in the database; and
   c) a third data portion containing individual data records obtained from the database for use with the sufficient statistics to determine said model representation contained in the first data portion.

22. The data structure of claim 21 wherein said model representation comprises a set of clusters to which data records may be assigned based on the degree to which each cluster describes the data record.

23. The data structure of claim 22 wherein each of said clusters is represented by a datapoint number, a mean for each ordered attribute, a spread for each ordered attribute, and a probability table for each discrete attribute.

24. The data structure of claim 22 wherein each of said data records may be assigned to only one of said clusters.

25. The data structure of claim 21 wherein a second data portion containing sufficient statistics of a portion of the data records in the database is organized by cluster and includes a data record number, a mean for each ordered attribute, a spread for each ordered attribute, and a probability table for each discrete attribute of those records summarized in said sufficient statistics.

26. The data structure of claim 22 wherein each of said data records may be assigned to each of said clusters with a probability based on the degree to which a given cluster describes said data record.

27. The data structure of claim 21 wherein said sufficient statistics comprises a set of clusters to which data records may be assigned based on the degree to which each cluster describes the data record.

28. The data structure of claim 27 wherein the sufficient statistics for each of said clusters is represented by a datapoint number, a mean for each ordered attribute, a spread for each ordered attribute, and a probability table for each discrete attribute which in combination with individual data records is used to produce the cluster model representation.

29. The data structure of claim 28 wherein each of said data records may be summarized with a data summarization associated with a data cluster or may also be assigned to a data summarization associated with a subcluster or may be left as a vector data record.

30. A computer-readable medium having computer-executable components comprising:
   a) a database component for interfacing with a database that stores data records containing both enumerated or discrete and ordered values;
   b) a rapid access memory component for storing at least of subset of said data records gathered from the database for processing;
   c) a modeling component for constructing and storing a model of said database by determining if a data record is sufficiently described by any of several clusters using cluster criteria and for updating said cluster model based on said data records and for evaluating whether further of said data records should be moved from said database into said rapid access memory for modeling.

31. The computer readable medium of claim 30 wherein said database component is adapted to store and said modeling component to construct a model of data records containing both enumerated or discrete and ordered values.

32. The computer readable medium of claim 30 wherein said modeling component is adapted to store said model of said database in the form of a datapoint number, a table of means, a table of spreads, and a table of probabilities for each cluster of said cluster model.

33. The computer readable medium of claim 30 wherein said modeling component is adapted to compare a new model to a previously constructed model to evaluate whether further of said data records should be moved from said database into said rapid access memory for modeling.

34. The computer readable medium of claim 30 wherein said modeling component is adapted to update said cluster model by calculating a weighted contribution by each of said data records in said rapid access memory.

\* \* \* \* \*